United States Patent
Winter et al.

(10) Patent No.: US 10,621,111 B2
(45) Date of Patent: *Apr. 14, 2020

(54) SYSTEM AND METHOD FOR UNIFIED SECURE REMOTE CONFIGURATION AND MANAGEMENT OF MULTIPLE APPLICATIONS ON EMBEDDED DEVICE PLATFORM

(71) Applicants: Timothy Clark Winter, Frederick, MD (US); Chinmay Shrikant Shete, Clarksburg, MD (US); Vinod Sitaram Mukkamala, Leesburg, VA (US)

(72) Inventors: Timothy Clark Winter, Frederick, MD (US); Chinmay Shrikant Shete, Clarksburg, MD (US); Vinod Sitaram Mukkamala, Leesburg, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/411,029

(22) Filed: May 13, 2019

(65) Prior Publication Data

US 2019/0268349 A1    Aug. 29, 2019

Related U.S. Application Data

(63) Continuation of application No. 15/339,414, filed on Oct. 31, 2016, now Pat. No. 10,318,437.

(51) Int. Cl.
| | | |
|---|---|---|
| *G06F 12/14* | (2006.01) | |
| *H04L 29/06* | (2006.01) | |
| *G06F 21/57* | (2013.01) | |
| *G06F 21/62* | (2013.01) | |

(52) U.S. Cl.
CPC ........ *G06F 12/1425* (2013.01); *G06F 21/57* (2013.01); *G06F 21/6218* (2013.01); *H04L 63/0272* (2013.01); *H04L 63/107* (2013.01); *H04L 63/20* (2013.01); *G06F 2212/1052* (2013.01)

(58) Field of Classification Search
CPC ........... G06F 12/1425; G06F 21/6218; G06F 2212/1052; G06F 21/57; H04L 63/20; H04L 63/107; H04L 63/0272
USPC ............................................................ 726/1
See application file for complete search history.

(56) References Cited

U.S. PATENT DOCUMENTS

| | | | | |
|---|---|---|---|---|
| 7,240,106 | B2* | 7/2007 | Cochran | H04L 29/12009 709/220 |
| 7,539,862 | B2* | 5/2009 | Edgett | H04L 63/08 709/223 |
| 8,134,954 | B2* | 3/2012 | Godfrey | H04L 29/06 370/328 |
| 8,843,503 | B2* | 9/2014 | Ayachitula | G06F 8/71 707/755 |

(Continued)

*Primary Examiner* — Kambiz Zand
*Assistant Examiner* — Benjamin A Kaplan
(74) *Attorney, Agent, or Firm* — Attentive Law; Paul Ratcliffe

(57) ABSTRACT

The present invention provides a system and method for remote configuration and management of internet of thing devices, whereby applications do not need to explicitly participate in a particular configuration scheme and the application configuration and management can be performed securely and remotely while the Secure Remote Management engine is architecturally decoupled from the bearing protocols used by the remote enterprise to configure and manage the device or devices.

15 Claims, 5 Drawing Sheets

(56) References Cited

U.S. PATENT DOCUMENTS

| | | | | |
|---|---|---|---|---|
| 2003/0018889 A1* | 1/2003 | Burnett | ............... | H04L 41/0809 713/153 |
| 2003/0140132 A1* | 7/2003 | Champagne | .......... | H04L 41/082 709/223 |
| 2005/0228874 A1* | 10/2005 | Edgett | .................... | H04L 63/08 709/220 |
| 2008/0250313 A1* | 10/2008 | Kamdar | ................. | G06F 9/451 715/700 |

* cited by examiner 400 global configuration structure 500 configuration tree

SYSTEM AND METHOD FOR UNIFIED SECURE REMOTE CONFIGURATION AND MANAGEMENT OF MULTIPLE APPLICATIONS ON EMBEDDED DEVICE PLATFORM

RELATED PATENT APPLICATION

The present application is a continuation of and claims priority to U.S. patent application Ser. No. 15/339,414 filed Oct. 31, 2016 entitled "System And Method For Unified Secure Remote Configuration And Management Of Multiple Applications On Embedded Device Platform", the content of which is incorporated herein by reference in its entirety.

FIELD OF THE INVENTION

This present invention relates to the field of the Internet of Things and the field of multi-variate device management and control.

BACKGROUND OF THE INVENTION

Modern computing systems may be generally characterized as a hardware/software system, where the hardware consists of components including dynamic memory elements, non-volatile storage elements, processing elements, and various input/output elements to interface with other hardware/software components. The software architecture typically can be segregated into a kernel, an operating system, and various applications. The kernel manages and delegates access to low-level hardware elements, the operating system interfaces with the kernel to setup and manage run-time environments on behalf of applications, and the applications complete system-specific tasks by executing sequences of instructions and accessing hardware and software resources via the operating system.

Many typical computing systems include a number of applications, each of which is delegated to perform a certain subset of tasks, and the overall system behavior is determined by a number of such applications operating disjointedly and in parallel. In practice, a well-structured application requires elements of configuration in order to conform its specific operation to the desired behavior of the system, whereby such configuration elements may include, for example, details on how to interface with the operating system, how to access other system resources such as networking protocols, and further configuration details which may only pertain to the particular operation of that application.

Often, on desktop and server operating systems, applications are configured and deployed independently where each application may mandate its own configuration elements and structure them as suited to its own needs. In some cases, applications may work collaboratively with the operating system in order to provide a standardized way to access or modify their configuration, such as utilizing the Simple Network Management Protocol (SNMP), Zero Configuration Networking (ZeroConf), or even an operating-system provided interface such as the Registry on Microsoft Windows. A key point of such applications is that they are a-priori cooperative in consuming configuration details using common protocols or system resources, meaning the application developer explicitly implements code to consume configuration in this way.

On mobile operating systems configuration of individual applications is typically handled by each application itself. There may be some availability of system level configuration stores, but not all applications are required or enforced to use them. In practice, an application on a mobile operating system may keep its configuration as accorded to its own structure and needs in a private location that is not accessible by other system components. A mobile operating system may extend some configuration capabilities to be managed remotely where those capabilities typically include operating system and network communications configuration elements. However, not all applications on a mobile operating system can be expected to be cooperative in the use of such schemes. Further the mechanism to utilize such remote management schemes will typically fix the management protocol, which may be proprietary or based on a standard such as the Open Mobile Alliance (OMA) Device Management (DM) protocol. Other applications on a mobile operating system will typically handle their own configuration utilizing their own private schemes, and most generally will rely on user input through a Graphical User Interface (GUI) as a key mechanism to manage the configuration.

SUMMARY OF INVENTION

In some systems, such as encountered in the Industrial Internet of Things (IIoT), it is necessary to leverage the architectures and paradigms of mobile operating systems, leveraging the inherent security and scalability built into those environments. However, it is not practical, desirable, or meaningful to directly access a GUI on each device in order to perform the administration. These systems are sometimes denoted 'headless', and it is necessary to provide a means of secure remote management to configure and manage the operating system and the applications. Further, it is expected that applications will be updated and new applications will be deployed and configured on these systems long after the initial installation and provisioning process is completed. Such operations must be capable of being performed reliably, securely, and remotely. Finally, it is necessary to provide some flexibility in the support of specific protocols used to configure the device or devices remotely, as different enterprises may employ different mechanisms and it is expected that new protocols and mechanisms will emerge as the space evolves.

The present invention provides a system and method whereby applications do not need to explicitly participate in a particular configuration scheme. The application configuration and management can be performed securely and remotely, and the Secure Remote Management engine is architecturally decoupled from the bearing protocols that will be used, for example, by the remote enterprise to configure and manage one or more devices, i.e. 'user devices' as referred to herein.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF EXEMPLARY EMBODIMENTS

Hereinafter, aspects of the methods and associated systems in accordance with various embodiments of the invention will be described. As used herein, any term in the singular may be interpreted to be in the plural, and alternatively, any term in the plural may be interpreted to be in the singular. It is appreciated that features of one embodiment as described herein may be used in conjunction with other embodiments.

Figure 1:
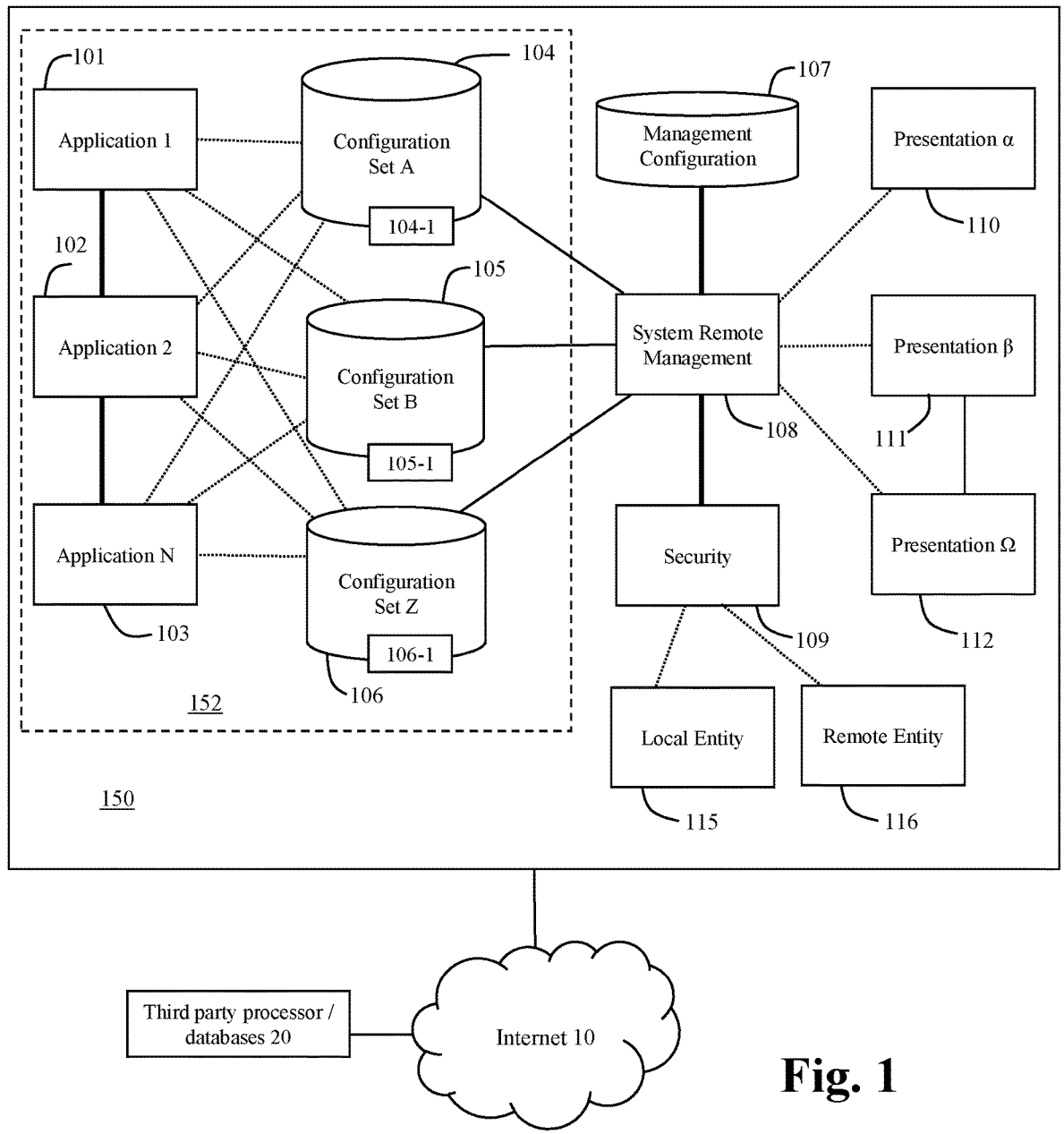
FIG. 1 depicts a system diagram of an illustrative embodiment of the present invention.

FIG. 1 provides a block diagram representative of a first embodiment of a system employing the present invention comprising a plurality of Applications 101, 102, 103. The operation of the applications 101, 102, 103 are influenced by a plurality of configuration elements or set of elements 104, 105, 106, whereby those configuration sets 104, 105, 106 are heuristically identified and scanned by a System Remote Management Entity 108. The operation of the System Remote Management entity 108 is further informed by a Management Configuration 107. In addition, the System Remote Management entity 108 enlists primitives or operations that can be performed on a configuration element (i.e. to read, write, or delete the element) as informed by the system Security 109 in order to extend and allow manipulation of the Configuration sets 104, 105, 106. Such manipulation may be by local or remote management applications whose operation extends through a plurality of Presentations 110, 111, 112. For example, and depending upon the structure of the underlying configuration, the primitives might map to read a row from a database or write a key/value pair into a global registry. Further, as an example of the system Security 109 informing the configuration, the Security 109 could load a security policy configuration and apply such policy configuration to the attempted configuration access before allowing or denying the access. Specifically, by way of further example, a particular configuration session may have established a role, and the security policy may have defined that the given role is allowed to invoke a "read" primitive, but not a "write" primitive.

Each of the one or more Applications 101, 102, 103 has been implemented in such a way as to allow their behavior to be influenced by a set of one or more Configurations sets 104, 105, 106. Each individual configuration set 104, 105, 106 is characterized as being backed by a non-volatile storage element 104-1, 105-1, 106-1. The system configuration enables the configuration set 104, 105, 106 to be persistent within the system, such as within a tangibly embodied computer memory, and modifications to that configuration set 104, 105, 106 are also persistent in the non-volatile storage. In a typical embodiment, the non-volatile storage is implemented as a flash memory, though it could also be a disk, battery-backed random access memory, or any other non-volatile storage mechanism employed by a computing system.

The various components of FIG. 1 may be in communication with each other in any suitable manner, such as over a suitable network. For example, the communication between components of FIG. 1 might be performed over the Internet 10. Further, the various components of FIG. 1 may be in communication with third party processors and/or databases 20 over the suitable network, e.g. Internet.

In operation, a particular application 101, 102, 103 may draw upon multiple configuration sets 104, 105, 106 that are logically separated within the system. For example, one configuration set (i.e. 104) may configure a communications protocol stack across the scope of the entire system (i.e. impacting the communications configuration of all applications 101, 102, 103) where another configuration set (i.e. 105) may only define configuration elements meaningful to a particular application (i.e. 101). From an operating system perspective, there may be different classes of configuration sets 104, 105, 106 characterized by the particular mechanism(s) that an application 101, 102, 103 is consuming (related to those configurations sets 104, 105, 106) which the system or application 101, 102, 103 would use to access the configuration set.

By way of example, one configuration set 104 may be kept within a SQL database, while a second configuration set 106 may be kept in a key/value pair global registry. Specifically, for example, all elements of configuration set 104 may be accessed using one set of methods (e.g. in a SQL database). Continuing, configuration set 105 might also be in a SQL database—but having or representing different parameters. At the same time, configuration set 106 might be a global registry. The configuration sets 104, 105, 106 may reside in a predictable location, backed by non-volatile storage, and extended through the file system application programming interface that is extended by the operating system. In this case, an embodiment may overlay additional structure to that configuration set 104, 105, 106 such as a schema and organization dictated by a database architecture. As stated above, the configuration set 104, 105, 106 could be accessed through database primitives such as the Structured Query Language (SQL).

However, there is no intermixing of the configuration sets 104, 105, 106, in accordance with embodiments of the invention. For example, configuration set 104 is not partly a SQL database and partly a global registry. A significant benefit of the present invention is that the system provides a unified scheme which can transparently manage multiple configuration sets which may themselves have differing underlying access mechanisms. The present invention enables the management system to access and work with the configuration sets 104, 105, 106 through the presentations 110, 111, 112 without the need to make any distinctions about the details of underlying access methods.

In other embodiments, the application 101, 102, 103 may overlay its own private structure onto the file based storage. In another embodiment, the configuration set 104, 105, 106 may be accessed through primitives extended by the operating system, such as providing an operating system implemented application programming interface to access the configuration sets 104, 105, 106 through a defined method, configuration, schema or so-called 'key-value' lookups. The system management scheme enables each application 101, 102, 103 to rely on one or more different configuration sets 104, 105, 106. The different applications 101, 102, 103 may rely on elements common to shared or specific configuration sets 104, 105, 106, and each application 101, 102, 103 may employ one or more mechanisms to access configuration sets 104, 105, 106 within the non-volatile storage.

The System Remote Management entity 108 employs methods to unify access to one or more underlying configuration sets 104, 105, 106 in order to abstract the details of the particular access methods that must be employed to manipulate those configuration sets 104, 105, 106. Further, to decouple those details from local or remote management entities which may access the configuration elements (included in those configuration sets 104, 105, 106), entity 108 employs one or more mechanisms depicted as Presentations 110, 111, 112.

The System Remote Management entity 108 employs a number of heuristics to scan the system and dynamically identify the configuration sets 104, 105, 106 which are present. The dynamic set of heuristics employed by the System Remote Management entity 108 are themselves configured by a private Management Configuration set 107 available to the System Remote Management entity 108, which management configuration set 107 itself may also be extended by the System Remote Management entity 108 for local or remote access. In one embodiment one such heuristic may, for example, define an algorithm to implement a method to scan a non-volatile file system to identify files that are placed within a certain area of the filesystem and which match a certain structure. For example, the certain structure could be a specific structure employed by a database. The system would then enumerate the contents of each file as according to that structure, to derive (from that enumeration) a set of individual configuration elements as described by that structure. Such processing identifies the applications 101, 102, 103 which are likely influenced by each of those configuration elements, and informs the System Remote Management entity 108 of the same.

In another embodiment, another such heuristic may, for example, define an algorithm to scan other system resources which may capture configuration elements which are extended by the operating system itself and not accessible directly from the file system. The system may enumerate the contents of those configuration elements, to determine applications 101, 102, 103 which are likely influenced by those configuration elements, and to inform the System Remote Management entity 108 of the same.

As the System Remote Management entity 108 employs one or multiple heuristics to identify the configuration sets 104, 105, 106 and configuration elements present on the system, the System Remote Management entity 108 forms in memory a global configuration abstraction. This global configuration abstraction is characterized by unambiguously indexing the location and access method for each configuration element discovered within the system. The configuration elements will subsequently be unambiguously referenced by another local or remote entity in a unified way, and subsequent operations may be invoked on those configuration elements.

The construction and arrangement of that global configuration abstraction employs one or more methods. In a first method, the global configuration abstraction is constructed in memory in the form of a tree, where each node is indexed in a way that references the access mechanism for an underlying configuration element, and the position of the node in the tree fixes an unambiguous reference to that configuration element. In other embodiments, other data structures may be employed to achieve the same effect. By scanning the system as per the configured heuristics and constructing a global configuration abstraction in this manner, the System Remote Management entity 108 is able to extend a common access method to other local or remote management entities. The common access method is agnostic of the details of the location and access method for each individual configuration element and the likely set of applications impacted by that configuration elements are identified. Further, operations on the global configuration abstraction can be unambiguously mapped to a set of operations on a particular underlying configuration set in an unambiguous manner.

The System Remote Management entity 108 is itself further configured with a set of access policies within its local Management Configuration 107 which is capable to define and restrict the access and operations allowed against the global configuration abstraction and by extension against the underlying configuration sets 104, 105, 106. By further extension, the Management Configuration 107 design allows the System Remote Management entity 108 to restrict and control access by local or remote management entities to the behavior of one or multiple applications 101, 102, 103. Specifically, the operation of those applications 101, 102, 103 is influenced by the underlying configuration sets 104, 105, 106. In one embodiment, the set of access policies defines a set of roles (e.g. 'users') associated with a set of operations (e.g. 'read/modify/write') that are associated with each element of the global configuration abstraction. The System Remote Management entity 108 may employ a security component 109 which may employ various primitives and services. The security component 109 is utilized by the operating system in order to validate and authenticate the role claimed by a local or remote management entity 108 that is invoking an operation on the global configuration abstraction. Such mechanisms may include, for example, local authentication (e.g. 'username/password'), credential based authentication, or enterprise authentication schemes such as RADIUS, DIAMETER, or Lightweight Directory Access Protocol (LDAP). The System Remote Management entity 108 will, upon loading its Management Configuration 107, cause the global configuration abstraction in memory to be annotated with the attributes that define policy based access control for each operation allowed/denied. Employing such a process allows each individual configuration element within the global configuration abstraction to be unambiguously associated with a policy based access control for each operation that may be performed on that configuration element.

The System Remote Management entity 108 may further annotate the global configuration abstraction with so-called 'views' as per its local Management Configuration 107. Such 'views' are optional and configurable, and in effect allow for the collection of multiple configuration elements into a logical structure that is not necessarily representative of the underlying organization of the configuration sets 104, 105, 106 but which is of logical utility from a system management perspective. For example, all configuration elements that impact network operation of a cellular data link may in practice be segregated across several underlying configuration sets 104, 105, 106. However, they may be accessed together through a unique subset of the global configuration abstraction, where that subset is collectively known as a 'view', and where access policies, as previously described, may also be applied to that 'view'. This logical abstraction provides some utility in cases where it is desirable to extend a disparate subset of the underlying configuration in a unified way to a local or remote management entity. The logical structure of that disparate subset can be unified in a common way and abstracted from the underlying structure of the participant configuration elements.

The System Remote Management entity 108 also allows operations to be invoked on the global configuration abstraction by a local entity 115 or remote management entity 116, whereby those operations may be characterized by a local entity 115 or remote management entity 116 having a unique Presentation 110, 111, 112. As an example, one such presentation may extend management access through the Simple Network Management Protocol (SNMP). Another such presentation may employ LWM2M/CoAP. A third such presentation may employ a proprietary or legacy scheme. In all cases the local or remote management entity will employ a common interface to the System Remote Management Entity 108, but may employ any other protocol or scheme to interface to a local or remote management framework. To the extent that such a presentation defines abstract operations on a configuration element—those operations will be mapped to equivalent operations within the System Remote Management entity 108 (e.g. 'read/modify/write'). To the extent that such a presentation 110, 111, 112 incorporates an underlying protocol where a security role can be defined and authenticated—security context of each requested operation will be also provided to the System Remote Management entity. In this way, the details of a particular management protocol that is employed by a local or remote management entity is abstracted completely from the details of how the underlying configuration sets are defined/arranged within the system. Further, underlying configurations which influence applications 101, 102, 103 can be managed via the System Remote Management entity 108 without regard to the particulars of what local or remote management entity is operating upon them. Further the applications 101, 102, 103 may rely on the System Remote Management entity 108 to apply the policies of the Security entity 109 for configuration access, and finally presentations 110, 111, 112 can be added or removed to the system in support of local or remote management entities, e.g. to support a new management protocol, in such a way that no applications need to be modified in support of such a change.

The System Remote Management entity 108 finally, as configured by the local Management Configuration 107, is configured with mechanisms to cause an application 101, 102, 103 to reload a configuration set and cause the application 101, 102, 103 itself to operate as according to behaviors defined by that modified configuration set. Multiple such mechanisms may be defined, will be associated with nodes in the global configuration abstraction, and will be invoked by the System Remote Management entity 108 as modifications are performed on global configuration abstraction nodes associated with a dependent application.

By way of example, the present invention could be utilized with all of the applications 101, 102, 103, configurations 104, 105, 106, and presentations 110, 111, 112 resident and operating within one device or 'box'. In this example, the 'device' would be running three (3) applications and hosting three (3) configurations. The device could be connected to a smart meter via a serial port, to a pressure sensor via Bluetooth, and to a head-end (enterprise/cloud/ . . . ) via a VPN over the Internet (e.g. as provided by a cellular modem). Application 1 might be an ANSI C12.19/C12.18 implementation capable of interacting with an ANSI smart electric meter, e.g. GE kV2. The configuration of application 1 might be a C12.18/C12.19 stack which may include:

Baud rate for C12.18 serial communications
    C12.18 protocol security passwords for reader/customer/programmer roles (these are 3 separate roles)
    Configuration of which ANSI C12.19 tables should be read and stored periodically for later retrieval
    A serial number that corresponds to the attached electric meter.

Application 2 might be a Bluetooth application that is capable of reading a Bluetooth enabled pressure sensor using the Bluetooth Low Energy GATT protocol. Configuration of Application 2 may include:

Bluetooth MAC address of pressure sensor
    Configuration interval (seconds) at which to periodically read/interrogate the pressure sensor
    Security credentials (e.g. device key) used to establish secure communications with the pressure sensor
    A list of Bluetooth GATT attributes to read and store periodically from the pressure sensor for later retrieval Application 3 might be a VPN that is used for secure communication to a head end system. The configuration for application 3 might include:

Secure credentials (certificates, keys) used to establish the VPN
    Server information for the VPN endpoing (i.e. 'who to contact')

Configuration 1 might be stored in a SQL database, Configuration 2 might be stored in a global key/value store (e.g. like the Windows registry), and Configuration 3 might be stored in a secure credential storage chip which is accessed over I2C (hardware) protocol and can be written and interacted with but not read.

Figure 4:
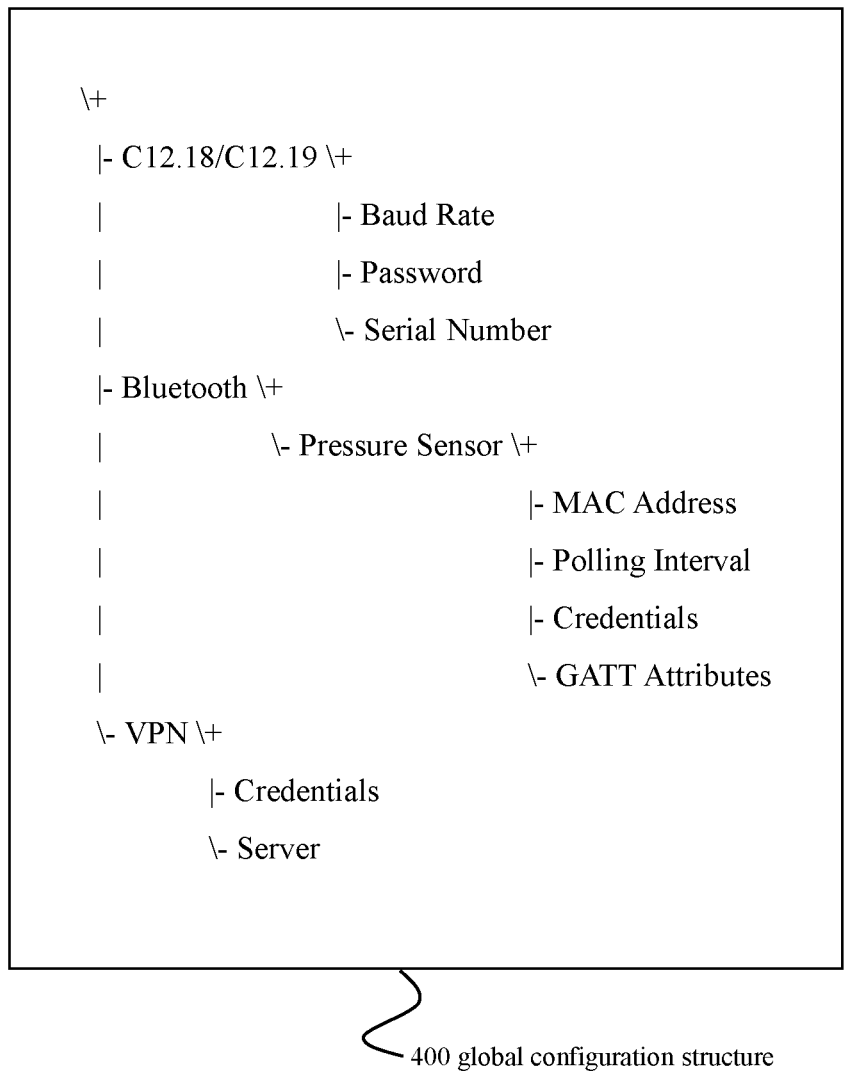
FIG. 4 is a diagram showing a global configuration structure, in accordance with one embodiment of the invention.

In this example the System Remote Management process may then construct a global configuration structure similar to that shown in FIG. 4.

Figure 5:
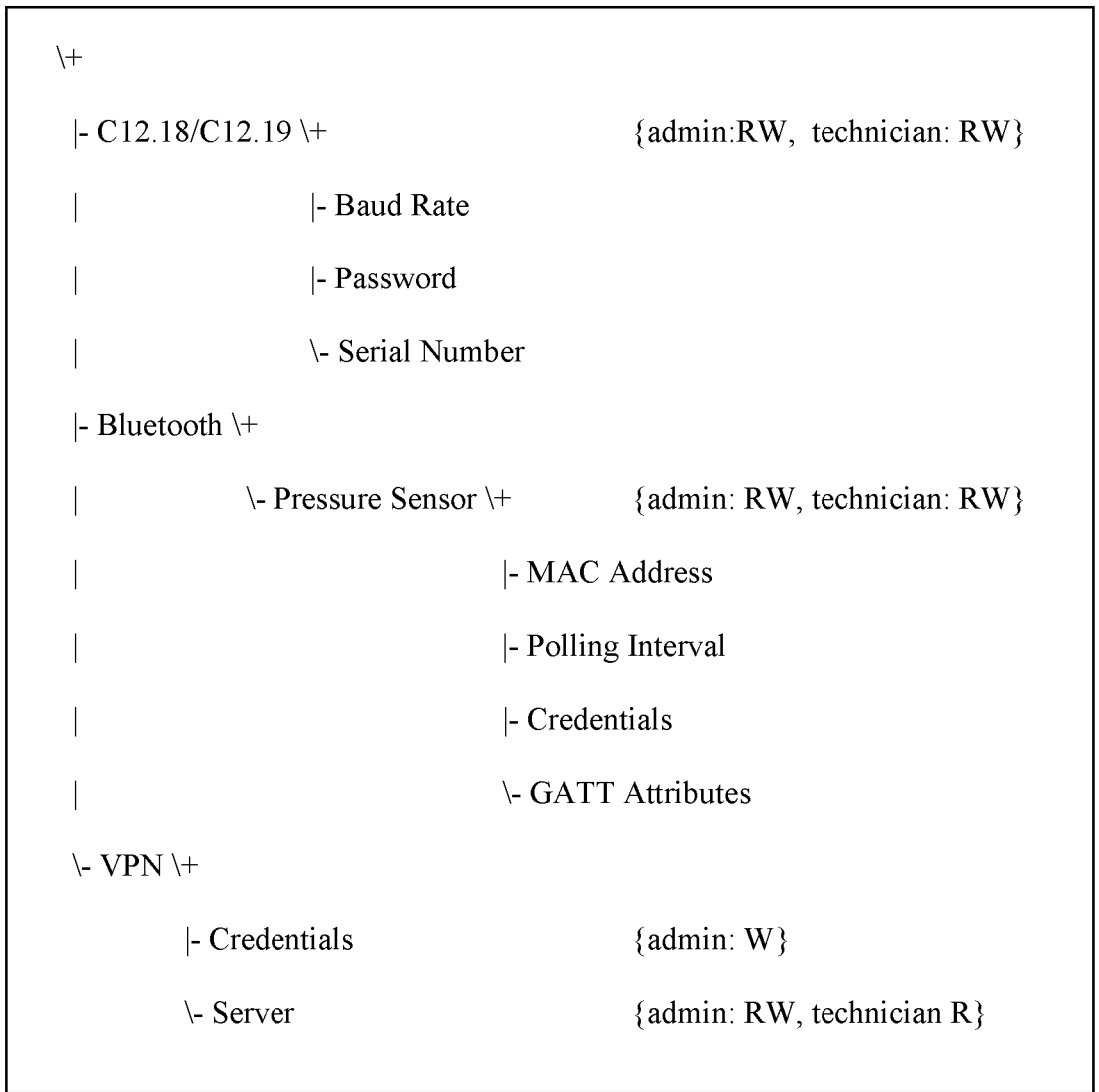
FIG. 5 is a diagram showing a configuration tree, in accordance with one embodiment of the invention.

Further, the system might also define, in the security policy, two users, "admin" and "technician". The primitives defined, for manipulating the configuration, might be defined as "read (R)" and "write (W)". The security policy may be overlaid/annotated upon the configuration tree as shown in FIG. 5.

Thus, an admin user, by use of the system of the present invention, can read and write the entire subtree for C12.18/C12.19, Bluetooth, and VPN. The technician might have similar access rights, except the technician cannot read nor write the VPN credentials, and can only read the VPN server setting. If a presentation access to the configuration is associated with a technician role, and the presentation attempts to read the VPN Credentials, then the access would fail.

Based on the scanning heuristics and the construction of the global table, the access methods are also associated with the nodes in the global configuration table, such that when the system remote management entity maps a generic invocation (read, write) into the specific method necessary to manipulate the underlying nonvolatile configuration, the remote management entity will know to utilize SQL APIs for C12.18/C12.19 subtree access, know to utilize key/value store APIs for the Bluetooth subtree, and know to access to secure credential storage APIs (e.g. low level access to underlying hardware) for VPN configuration access.

Further consider an SNMP configuration interface, employed by the system, that is provided for remote configuration. The SNMP configuration interface is one embodiment of a 'presentation'. In general, SNMP protocol represents data in a structured format known as a MIB (Management Information Base). For this exemplary embodiment, consider the MIB defines a data structure to interact with the C12.18/C12.19 configuration and the Bluetooth Configuration. Thus, a Presentation that is implementing the SNMP protocol with the MIB for a C12.18/C12.19 configurations will interact with a remote entity using the standardized SNMP protocol to convey operations (get/set) on that MIB, and in turn invoke the corresponding read/write operations on the System Remote Management service, which itself in turn can invoke the underlying access methods as bound to the global configuration abstraction defined above.

SNMP protocol itself also allows for a meaningful mapping of the role, admin or technician. Thus, when a remote SNMP manager connects to the device, for example, it will connect to the SNMP Presentation, it will authenticate and establish its role, e.g. as 'admin', and then it may invoke on the MIB a command such as 'Set VPN Server=example.machfu.com". This Command internally is translated by the Presentation implementation to a System Remote Management API invocation "admin: Write VPN Server=example.machfu.com". The System Remote Management implementation will validate that the access is allowed for that role, and will then invoke the underlying access method (direct HW access in this case) to cause the setting 'VPN Server' to be updated to 'example.machfu.com' in the underlying configuration storage.

Another presentation, e.g. using the CoAP protocol with JSON payloads to represent the configuration data, may also be added. That presentation, similarly to SNMP presentation, will interact with the remote entity using the CoAP/JSON protocol, will internally map those access requests to the System Remote Management APIs, and the System Remote Management implementation will utilize the underlying access methods defined in the configuration tree to manipulate the underlying configuration.

The method, configuration, or system of the present invention can be generalized to configure 'applications' in the sense of adding, removing, or/upgrading them on the device. However, the method or scheme of the present invention is ideally suited to allow unified access to specific configuration elements of the operating system and/or existing applications that are deployed on to the device. The device, i.e. user device, may be any of a smartphone, cell phone, mobile phone, computer, laptop computer, tablet, netbook, palmtop, other mobile device, desktop computer, smart television, smart fridge, or other device, for example.

Figure 2:
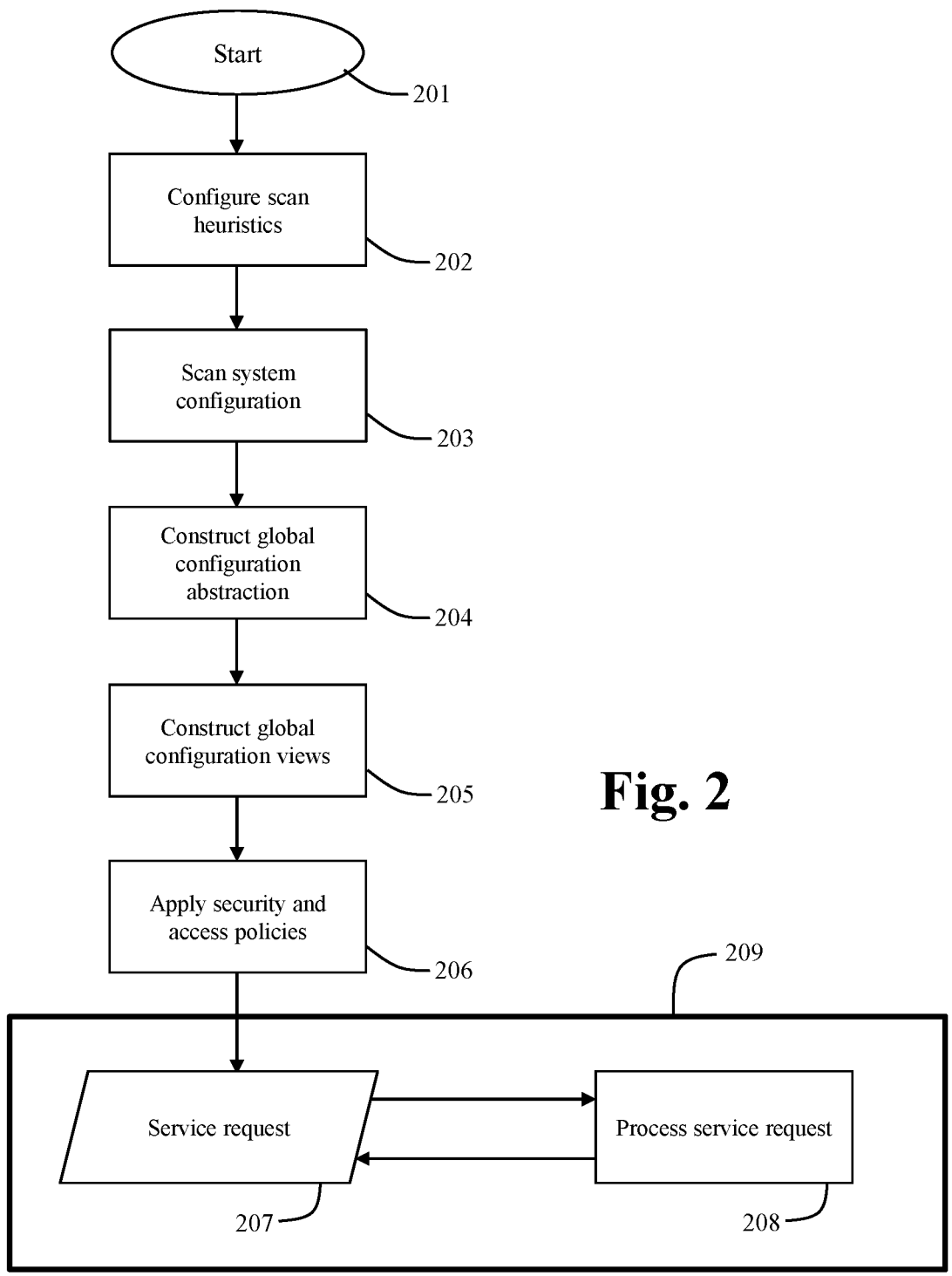
FIG. 2 depicts a flow diagram utilized by an illustrative embodiment of the methods employed by the present invention.

Depicted in FIG. 2 is a flow diagram that details an embodiment of the process followed by the System Remote Management entity 108 in its operation. In step 201 the System Remote Management entity 108 is started by the operating system. In step 202 the System Remote Management entity 108 consults is local Management Configuration 107 and loads and configures the heuristics. The heuristics will be used to scan the system, identify the configuration sets, enumerate the configuration elements, and construct the global system configuration abstraction in memory. In step 203 the System Remote Management entity 108 invokes the heuristics to scan the system. In step 204 the System Remote Management entity 108 constructs the global configuration abstraction. In step 205 the System Remote Management entity 108, as per the Management Configuration 107, constructs logical global configuration views over the global configuration abstraction as previously described herein. In step 206 the System Remote Management entity 108, as per the Management Configuration 107, annotates the global configuration abstraction with the security policy that dictates the roles and operations allowed on the elements within the global configuration abstraction. In step 209, which is comprised of step 207 and step 208, the System Remote Management entity 108 receives requests from local or remote management entities and processes those requests. Step 209 is further detailed in FIG. 3.

Figure 3:
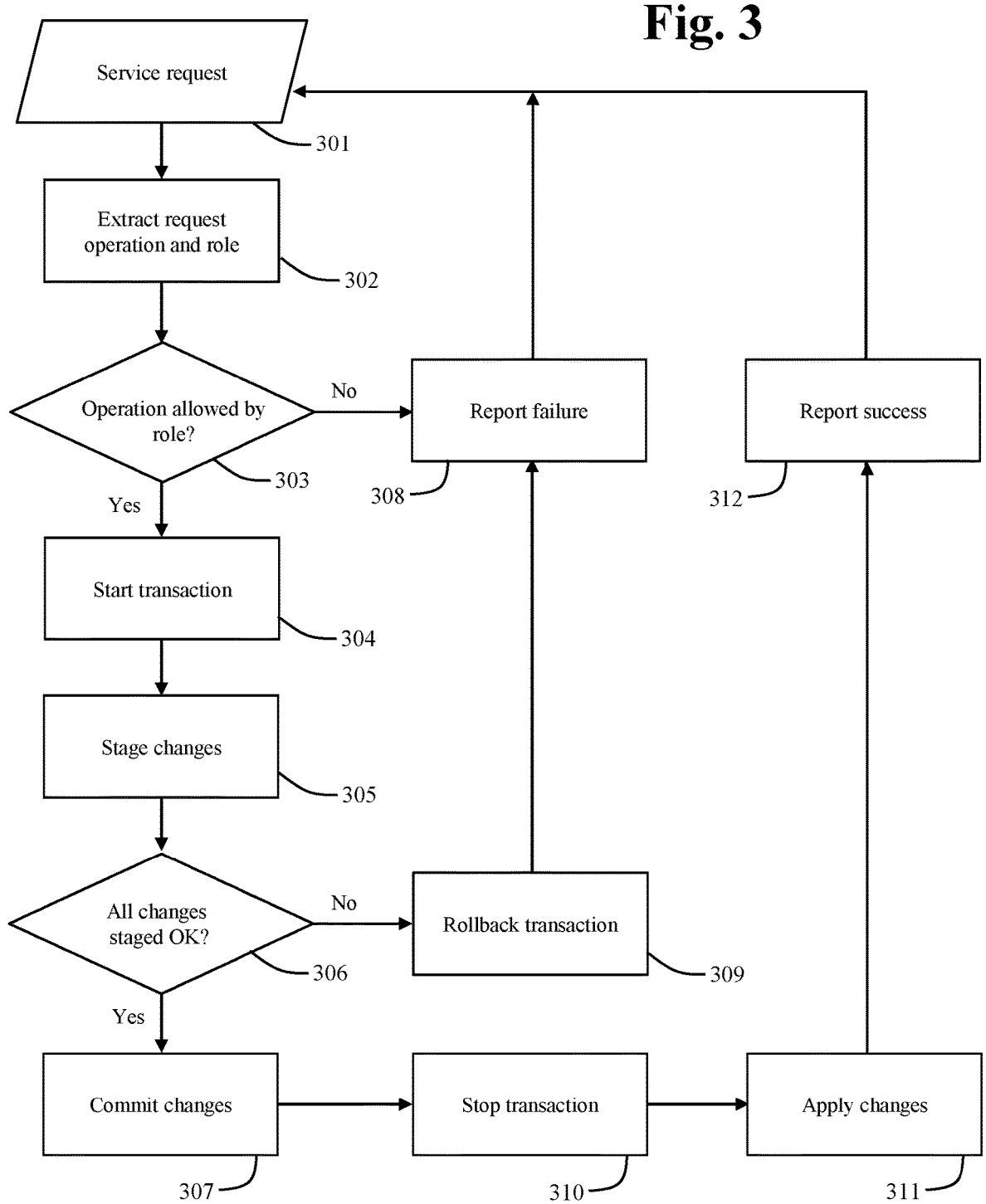
FIG. 3 depicts an additional flow diagram utilized by an illustrative embodiment of the methods employed by the present invention.

FIG. 3 provides a flow diagram that details an exemplary method of the process followed by the System Remote Management entity 108 to receive and service requests from local or remote management entities, via their respective presentations 110, 111, 112. As shown in FIG. 3, in step 301 a management request is received. Then, the process passes to step 302. In step 302 the details of the requested operation, the role associated with the request, and the detailed elements of the global configuration abstraction (that are to be operated on by the request) are extracted from the request. In step 303 the security policy associated with the affected nodes contained within the global configuration abstraction are considered in conjunction with the security context (roles and operations required by the request) to determine if the request is allowed to proceed as constrained by the security policy. If the operation is permitted, the System Remote Management entity 108 proceeds to step 304. If the request is not allowed to proceed, as dictated by the security policy, then the request is rejected and the System Remote Management entity 108 proceeds to step 308. In step 308 the failure of the request is indicated to the requesting local or remote management entity.

In step 304 the System Remote Management entity 109 starts a transaction, which in particular means to arrange a checkpoint in the global configuration abstraction such that the requested operation may be 'undone' if it fails at a subsequent point. In step 305 the System Remote Management entity 108 initiates the configuration change process by applying the requested operations to a working copy of the underlying configuration sets. In step 306 the System Remote Management entity 108 ascertains whether or not all operations involved in servicing the request have been successfully completed, and that all changes have been successfully staged to a working copy. In step 306, if the complete set of operations has not been successfully completed, then the System Remote Management entity 108 will proceed to step 309. In step 309 the intermediate changes on the working copies will be discarded, and the System Remote Management entity 108 will proceed to step 308 without any modification to the global configuration abstraction or the underlying configuration sets.

In step 306, if the complete set of operations has been successfully completed, then the System Remote Management entity 108 will proceed to step 307. In step 307 the System Remote Management entity 108 will commit the working copies of the underlying global system configuration to the affected underlying configuration sets, and proceed to step 310. In step 310 the System Remote Management entity will stop the transaction and clean up the working copies, and proceed to step 311. In step 311 the System Remote Management entity 108 will apply heuristics to cause the applications associated with any modified configuration elements to reload the affected configuration sets, and then proceed to step 312. In step 312 the System Remote Management entity 102 will report success to the requesting local or remote management entity. Note that this general flow covers all types of operations. However in certain subsets of operations (e.g. 'read only') the steps 304, 305, 306, 309, 310, 311 may in practice be 'NULL' actions that make no modifications and take no effect.

The system, methods, and mechanisms of the present invention, as described herein, are suitable for controlling or managing one 'device' or may manage multiple devices such as the management of multiple instances of an application virtualized across multiple physical processing elements.

The described embodiments may be implemented as a system, method, apparatus or article of manufacture using standard programming and/or engineering techniques related to software, firmware, hardware, or any combination thereof. The described operations may be implemented as code maintained in a "computer readable medium," where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code performing features of the invention may be implemented. A device in which the code implementing the described embodiments of operations is encoded may comprise a computer readable medium or hardware logic. Of course, those skilled in the art will recognize that many modifications may be made to these configurations without departing from the scope of the present invention, and that the article of manufacture may comprise suitable information bearing medium known in the art.

In an embodiment of the invention, the systems and methods use networks, wherein, the term, 'networks' means a system allowing interaction between two or more electronic devices, and includes any form of inter/intra enterprise environment such as the world wide web, Local Area Network (LAN), Wide Area Network (WAN), Storage Area Network (SAN) or any form of Intranet or Internet.

In embodiments of the invention, the systems and methods can be practiced using a specialized electronic device, i.e. a processing machine, which is provided with instructions to implement embodiments of the invention. An electronic device for the purpose of this invention is selected from any device capable of processing or representing data to a user and providing access to a network or any system similar to the internet, wherein the electronic device may be selected from but not limited to tablets, computers, personal computers, mobile phones, smartphones, cell phone, laptops, palmtops, portable media players and personal digital assistants, netbook, other mobile device, or other processing devices, for example.

As noted above, the processing machine used to implement the invention may be a suitable computer or other processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the various steps of the processes of the invention.

The processing machine used to implement the invention may utilize a suitable operating system, such as Android. Thus, embodiments of the invention may also include a processing machine running the Windows™ 10™ operating system, the Windows™ 8™ operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner and/or in communication with each other in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP/IP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A remote processing device that updates a selected configuration on the device comprising:
   a device processor and device machine readable instructions on a tangibly embodied device memory;
   the device having a communication portion for receiving and transmitting;

the device having a first configuration set and a second configuration set;

the device processor performing processing, based on the device machine readable instructions including:

performing a scan of the device and forming a global configuration abstraction from the first configuration set and the second configuration set, the global configuration abstracting including a first access method for the first configuration set and a second access method for the second configuration set; and saving the global configuration abstraction as a global configuration file on the device;

receiving, by the communication portion of the device, a configuration update request and a set of configuration set update data from a remote computer;

the device processor performing processing, based on the device machine readable instructions and the set of configuration set update data including:

confirming that the set of configuration set update data satisfies a set of predetermined criteria, the predetermined criteria disposed in a device database;

generating a working copy of at least a portion of the global configuration abstraction using the set of configuration set update data and the global configuration abstraction;

updating the first configuration set or the second configuration set by invoking the first access method to update the first configuration set or invoking the second access method to update the second configuration set until the update data is updated on the device; and updating the global configuration file on the user device using the working copy.

2. The device of claim 1, wherein the configuration update request includes request attributes and the device identifies one of the first configuration set or the second configuration set to update based on the request attributes.

3. The device of claim 1, wherein the device processor includes a device processor indexing portion for indexing the location and access method for each of a plurality of configuration elements discovered, by the device processor indexing portion.

4. The device of claim 1, the global configuration abstraction is in the form of a tree, the tree including a plurality of nodes.

5. The device of claim 4, wherein at least one node of the plurality of nodes is indexed with an access mechanism reference for an underlying configuration element, and a position of the at least one node in the tree identifies an unambiguous reference to the configuration element.

6. The system of claim 3, wherein the device processor indexing portion annotating the global configuration abstraction with a security policy.

7. The system of claim 6, wherein the security policy sets permissions for the plurality of configuration elements within the global configuration abstraction.

8. The system of claim 3, the device processor indexing portion including a security component, the security component performing validation processing for the selected configuration.

9. The system of claim 8, the security component performing validation related processing for the selected configuration including applying a security policy.

10. The system of claim 9, the security policy dictates permissions.

11. The system of claim 1, the device is constituted by a smart phone.

12. A method to update a selected configuration on a remote device, the method comprising:

scanning, by a remote device, a first configuration set on the remote device and a second configuration set on the remote device to form a global abstraction, wherein the remote device is embodied by a remote tangibly embodied computer including a remote processor portion and remote device machine readable instructions on a tangibly embodied remote device memory;

forming by the remote device, a global configuration abstraction from the scan, wherein the global configuration abstraction includes a first access method for the first configuration set and a second access method for the second configuration set;

saving the global configuration abstraction as a global configuration file on the remote device;

receiving, by a remote device communication portion, an update request including a set of update information for updating a selected configuration from one of the first configuration set on the remote device and the second configuration set on the remote device, wherein the set of information includes at least one request attribute;

identifying the selected configuration to update based on the at least one request attribute;

confirming, by the remote device, the configuration set update data satisfies a set of predetermined criteria, the predetermined criteria disposed in the remote device memory;

generating, by the remote device, a working copy of at least a portion of the global configuration abstraction using the configuration update data and the global configuration abstraction;

updating, by the remote device, the first configuration set or second configuration set by invoking the first access method to update the first configuration set or invoking the second access method to update the second configuration set until the update data is updated on the device;

updating, by the user device, the global configuration file on the user device using the working copy.

13. The method of claim 12, further comprising validating, by a security component associated with the remote device processor, the selected configuration.

14. The method of claim 13, wherein the validating includes applying a security policy.

15. The method of claim 14, wherein applying the security policy sets permissions.

* * * * *